Patented Nov. 29, 1938

2,138,384

UNITED STATES PATENT OFFICE 2,138,384

TITANIUM PIGMENTS

Georg Meder, Leverkusen-I. G. Werk, Germany, assignor to I. G. Farbenindustrie Aktiengesellschaft, Frankfort-on-the-Main, Germany No Drawing. Application April 15, 1937, Serial No. 137,044. In Germany April 17, 1936

5 Claims. (Cl. 134—58)

The present invention relates to titanium pigments and to a process of manufacturing the same.

In accordance with the present invention mixed crystals of tatanium dioxide, crystallizing tetragonally, and titanium sesquioxide, crystallizing rhombohedrally and having the crystalline structure of corundum, are prepared. In said mixed crystals the titanium sesquioxide can be partially replaced by one or more of the following metal oxides which have a similar crystal lattice structure: $Al_2O_3$, $Cr_2O_3$, $Fe_2O_3$, $V_2O_3$ and $Rh_2O_3$. All these mixed crystals constitute very good pigments. Mixed crystals consisting of $TiO_2$ and some tenths per cent of $Ti_2O_3$, form pigments of intense coloration. When increasing the $Ti_2O_3$ content the shade becomes more intense. Depending upon the composition of the mixed crystals, there result pigments of black to blue shades, which show a good covering power and surprisingly good properties with regard to fastness to chalking and to the influence of cement. The mixed crystals in which one part of the $Ti_2O_3$ is replaced by the $Al_2O_3$, $Cr_2O_3$, $Fe_2O_3$, $V_2O_3$ and $Rh_2O_3$-components yield pigments from blackish-grey, pigeon-blue, yellow, gold-yellow, orange to white shades. All these vari-colored and white pigments show surprisingly good color retention properties. It follows that the mutual neutralization of the lattice energies of the crystallographic structure of the elements produces very stable pigments which meet individual specific requirements and are therefore technically valuable. They can be used as glazing, enamel, and anti-rust pigments as well as pigments for coloring artificial silk. When imbedded in artificial silk the silk is delustered and has a beautiful shade. Furthermore the pigments do not unfavorably influence the properties of the artificial silk.

The new pigments are obtained by causing the single components to react one upon the other at an elevated temperature, whereby care must be taken that no oxidation takes place. One may produce such a pigment, for example, by making titanium hydroxide into a paste with a solution of a titanous salt and then heating the mixture to about 800 to 1100° C. while excluding oxidizing influences, for instance by treating the mixture in a reducing or inert atmosphere and eventually in the presence of reducing substances, such as carbohydrates, $Sb_2O_3$, $As_2O_3$ and so on. The reaction can also be performed by intimately mixing $TiO_2$ with corresponding quantities of Al, Cr, Fe, V and/or Rh in a finely divided metallic state, such as powder, dust, colloidal solutions or the like and heating this mixture with the exclusion of oxygen for a short time, for instance about one hour to 800 to 1100° C. or causing the mixture to burn off in itself after previous priming.

The following examples illustrate the invention, without restricting it thereto.

*Example 1*

20 kgs. of titanium hydroxide containing about 14% of water are made into a paste with 20 liters of a solution of titanous sulfate containing about 100 g. of $Ti_2O_3$ per liter. The mass is heated with the exclusion of oxidizing influences for about one hour to 900 to 950°. The reaction product is washed and dried in the usual manner. An intensely colored pigeon-blue pigment is obtained which is absolutely fast to light and which can be used among others as anti-rust paint because of its slight reducing properties.

*Example 2*

20 kgs. of titanium hydroxide containing about 14% of water are made into a paste with 25 liters of a titanous chloride solution containing about 70 g. of $Ti_2O_3$ per liter to which solution about 250 g. of $Cr_2O_3$ are added in the form of a soluble salt. Then the mixture is calcined with the exclusion of oxidizing influences for about one hour at 900 to 960°. A reddish-yellow pigment is thus obtained which is so stable that it can be used as pigment for enamels and glazings to which it confers a gold-yellow coloration.

*Example 3*

20 kgs. of titanium hydroxide containing about 14% of water are well mixed with 2 kgs. of $Al(OH)_3$ and then made into a paste with 20 to 30 liters of a titanium chloride solution in the same concentration as indicated in Example 2. When calcining the mixture for 1 to 2 hours to 900 to 950°, a white pigment of good covering power is obtained which is well suitable as a paint for buildings and the like.

*Example 4*

33⅓ kgs. of $TiO_2$ are made into a paste with about 40 to 70 liters of a titanous chloride solution in the same concentration as indicated in Example 2 while adding thereto about 8 kgs. of sugar. Then the mixture is calcined for 1 to 2 hours at 1000° C. while avoiding any oxidation. The product obtained is a deep black pigment which is stable in every respect and has a soft texture. It is suitable as anti-rust paint. When imbedded in artificial silk the silk has a dull lustre and beautiful black coloration.

I claim:

1. Mixed crystals of titanium dioxide, crystallizing tetragonally, and titanium sesquioxide, crystallizing rhombohedrally and having the crystalline structure of corundum, in which a part of the titanium sesquioxide is replaced by a metal oxide having a similar crystal lattice structure selected from the group consisting of: $Al_2O_3$, $Cr_2O_3$, $Fe_2O_3$, $V_2O_3$ and $Rh_2O_3$.

2. Mixed crystals of titanium dioxide, crystallizing tetragonally, and a minor amount of titanium sesquioxide, crystallizing rhombohedrally and having the crystalline structure of corundum, in which a part of the titanium sesquioxide is replaced by a metal oxide having a similar crystal lattice structure selected from the group consisting of: $Al_2O_3$, $Cr_2O_3$, $Fe_2O_3$, $V_2O_3$ and $Rh_2O_3$.

3. Process of preparing mixed crystals of titanium dioxide, crystallizing tetragonally, and titanium sesquioxide, crystallizing rhombohedrally and having the crystalline structure of corundum, which comprises heating titanium dioxide with a reducing agent of the group consisting of a titanous compound, Al, Cr, Fe, V and Rh to a temperature of about 800 to about 1100° C., while excluding oxidizing influences.

4. Process of preparing mixed crystals of titanium dioxide, crystallizing tetragonally, and titanium sesquioxide, crystallizing rhombohedrally and having the crystalline structure of corundum, which comprises heating titanium dioxide with a titanous compound to a temperature of about 800 to about 1100° C., while excluding oxidizing influences.

5. Process of preparing mixed crystals of titanium dioxide, crystallizing tetragonally, and titanium sesquioxide, crystallizing rhombohedrally and having the crystalline structure of corundum, which comprises mixing titanium dioxide with a metal of the group consisting of: Al, Cr, Fe, V and Rh in a finely divided state and causing the mixture to react, while excluding oxidizing influences.

GEORG MEDER.